(12) United States Patent
Shoham et al.

(10) Patent No.: US 11,526,392 B2
(45) Date of Patent: Dec. 13, 2022

(54) SYSTEM AND METHOD FOR INFERRING DEVICE MODEL BASED ON MEDIA ACCESS CONTROL ADDRESS

(71) Applicant: Armis Security Ltd., Tel Aviv-Jaffa (IL)

(72) Inventors: Ron Shoham, Tel Aviv (IL); Tom Hanetz, Tel Aviv (IL); Yuval Friedlander, Petah-Tiqwa (IL); Gil Ben Zvi, Hod Hasharon (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 0 days.

(21) Appl. No.: 16/868,914

(22) Filed: May 7, 2020

(65) Prior Publication Data

US 2021/0349774 A1    Nov. 11, 2021

(51) Int. Cl.
*G06F 11/07*     (2006.01)
*G06N 7/00*      (2006.01)

(52) U.S. Cl.
CPC ........ *G06F 11/079* (2013.01); *G06F 11/0709* (2013.01); *G06F 11/0751* (2013.01); *G06N 7/00* (2013.01)

(58) Field of Classification Search
CPC ............... G06F 11/079; G06F 11/0709; G06F 11/0751; G06F 11/0775; G06N 7/00
See application file for complete search history.

(56) References Cited

U.S. PATENT DOCUMENTS

| | | | | |
|---|---|---|---|---|
| 10,567,243 | B2* | 2/2020 | Tippenhauer | ......... H04L 43/045 |
| 2001/0048661 | A1* | 12/2001 | Clear | ...................... H04L 45/22 370/220 |

(Continued)

FOREIGN PATENT DOCUMENTS

| CN | 107743108 A | 2/2018 |
|---|---|---|
| CN | 109246685 A | 1/2019 |

(Continued)

OTHER PUBLICATIONS

Martin, et al., "Decomposition of MAC Address Structure for Granular Device Inference," ACSAC, 2016, Los Angeles, CA, pp. 78-88.

(Continued)

*Primary Examiner* — Jigar P Patel
(74) *Attorney, Agent, or Firm* — M&B IP Analysts, LLC (57) ABSTRACT

A system and method for inferring device models. The method includes determining block statistics for each block of a plurality of blocks of a plurality of media access control (MAC) addresses, the plurality of blocks having a plurality of respective prefixes, wherein the plurality of blocks are grouped based on commonalities among the plurality of respective prefixes; generating an aggregated statistical model for the plurality of blocks based on the plurality of MAC addresses and the block statistics, wherein each block is a string of digits included in one of the plurality of MAC addresses; and applying the aggregated statistical model to the block statistics of at least one block of the plurality of blocks in order to determine at least one inferred device model, wherein each of the at least one block is grouped into the same group.

18 Claims, 4 Drawing Sheets

(56) References Cited

U.S. PATENT DOCUMENTS

| | | | |
|---|---|---|---|
| 2008/0200181 A1* | 8/2008 | Zill | H04L 41/0886 |
| | | | 455/456.1 |
| 2014/0317270 A1* | 10/2014 | Besehanic | H04L 61/103 |
| | | | 709/224 |
| 2015/0200827 A1* | 7/2015 | Agarwal | H04L 45/28 |
| | | | 714/37 |
| 2016/0203316 A1* | 7/2016 | Mace | G06F 21/55 |
| | | | 726/23 |
| 2016/0253069 A1 | 9/2016 | Zapletal | |
| 2017/0034161 A1* | 2/2017 | Isola | G06F 21/577 |
| 2018/0191593 A1* | 7/2018 | De Knijf | G06F 16/20 |
| 2019/0132286 A1 | 5/2019 | Holla et al. | |

FOREIGN PATENT DOCUMENTS

| | | | |
|---|---|---|---|
| EP | 3154242 A1 | 4/2017 | |
| WO | 2019064237 A1 | 4/2019 | |
| WO | WO-2019064237 A1 * | 4/2019 | G06K 9/6218 |

OTHER PUBLICATIONS

International Search Report and Written Opinion of International Searching Authority for PCT/IB2021/053648, Jerusalem, Israel, dated Jul. 13, 2021.

* cited by examiner

FIG. 4

SYSTEM AND METHOD FOR INFERRING DEVICE MODEL BASED ON MEDIA ACCESS CONTROL ADDRESS

TECHNICAL FIELD

The present disclosure relates generally to computing device profiling, and more specifically to inferring device attributes.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack. There are additional cybersecurity challenges due to high demand for employees or other users of network systems to bring their own devices, the dangers of which may not be easily recognizable.

To protect networked systems against malicious entities accessing the network, some existing solutions attempt to profile devices accessing the network. Such profiling may be helpful for detecting anomalous activity and for determining which cybersecurity mitigation actions are needed for activity of a given device. Providing accurate profiling is a critical challenge to ensuring that appropriate mitigation actions are taken.

The challenge involved with profiling a user device is magnified by the fact there is no industry standard for querying and/or obtaining information from user devices, user devices, and so on.

Media Access Control (MAC) addresses are unique identifiers assigned to Network Interface Controllers (NICs) for use as a network address in communications with a network segment. Hardware manufacturers sometimes assign sequential MAC addresses to similar devices.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for inferring device models. The method comprises: determining block statistics for each block of a plurality of blocks of a plurality of media access control (MAC) addresses, the plurality of blocks having a plurality of respective prefixes, wherein the plurality of blocks are grouped based on commonalities among the plurality of respective prefixes; generating an aggregated statistical model for the plurality of blocks based on the plurality of MAC addresses and the block statistics, wherein each block is a string of digits included in one of the plurality of MAC addresses; and applying the aggregated statistical model to the block statistics of at least one block of the plurality of blocks in order to determine at least one inferred device model, wherein each of the at least one block is grouped into the same group.

Certain embodiments disclosed herein also include a non-transitory computer readable medium having stored thereon causing a processing circuitry to execute a process, the process comprising: determining block statistics for each block of a plurality of blocks of a plurality of media access control (MAC) addresses, the plurality of blocks having a plurality of respective prefixes, wherein the plurality of blocks are grouped based on commonalities among the plurality of respective prefixes; generating an aggregated statistical model for the plurality of blocks based on the plurality of MAC addresses and the block statistics, wherein each block is a string of digits included in one of the plurality of MAC addresses; and applying the aggregated statistical model to the block statistics of at least one block of the plurality of blocks in order to determine at least one inferred device model, wherein each of the at least one block is grouped into the same group.

Certain embodiments disclosed herein also include a system for inferring device models. The system comprises: a processing circuitry; and a memory, the memory containing instructions that, when executed by the processing circuitry, configure the system to: determine block statistics for each block of a plurality of blocks of a plurality of media access control (MAC) addresses, the plurality of blocks having a plurality of respective prefixes, wherein the plurality of blocks are grouped based on commonalities among the plurality of respective prefixes; generate an aggregated statistical model for the plurality of blocks based on the plurality of MAC addresses and the block statistics, wherein each block is a string of digits included in one of the plurality of MAC addresses; and apply the aggregated statistical model to the block statistics of at least one block of the plurality of blocks in order to determine at least one inferred device model, wherein each of the at least one block is grouped into the same group.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Data required for cybersecurity purposes may be explicitly included in incoming data streams. In particular, it has been identified that device model data, which is useful for predicting normal device activity, is often not included. This may occur, for example, when there is partial coverage of network data or partial coverage due to sampled traffic data.

In this regard, it has been identified that the aforementioned tendency of hardware manufacturers to use sequential MAC addresses for similar devices can be leveraged in order to predict device models. At the time of filing of this application, a valid MAC address is typically a representation of 12 hexadecimal digits, the first six of which are a common prefix assigned to a specific manufacturer referred to as an organizationally unique identifier (OUI). For example, if AA:AA:AA is the OUI assigned to manufacturer "X," then a block AA:AA:AA:BB:CC may include only devices having device model "Y." To this end, the disclosed embodiments provide techniques for determining device models implicitly using MAC addresses.

It has also been identified that privacy concerns typically require that device MAC addresses be kept secret from external entities. Accordingly, the disclosed embodiments further include techniques for utilizing an aggregated statistical model to infer device models based on MAC address data without requiring storage of the MAC addresses on-premises where the device model data will be utilized.

The various disclosed embodiments include a method and system for inferring device models based on MAC address data. MAC addresses from a data source are grouped based on their respective prefixes. Statistics are generated for each MAC address based on the its prefix blocks. The blocks include the 8 digit prefixes and 10 digit prefixes of each MAC address. Device model data is determined for each MAC address based on the statistics. The device model data may include data such as an inferred device model, a number of occurrences of the device model, a ratio of the number of occurrences of the device model relative to an entire population for the block, and the like. The inferred device model may be added to a profile for the device associated with the MAC address.

In an embodiment, a confidence level is generated based on the device model data for each MAC address. The confidence level indicates a likelihood that the inferred device model for the MAC address is accurate. In a further embodiment, only inferred device models having a confidence level above a threshold are used for profiling.

Additionally, to aid in inferring MAC addresses, the disclosed embodiments also include techniques for preprocessing raw data indicative of device models. Such embodiments increase the accuracy of the device model inferences which, in turn, allow for more accurate device profiling.

The disclosed embodiments allow for providing more complete datasets to be used for profiling devices and, therefore, provide more accurate device profiles. Consequently, device profiles including device model data inferred as described herein can be used to more accurately identify abnormalities or other behavior which may indicate malicious activity.

Figure 1:
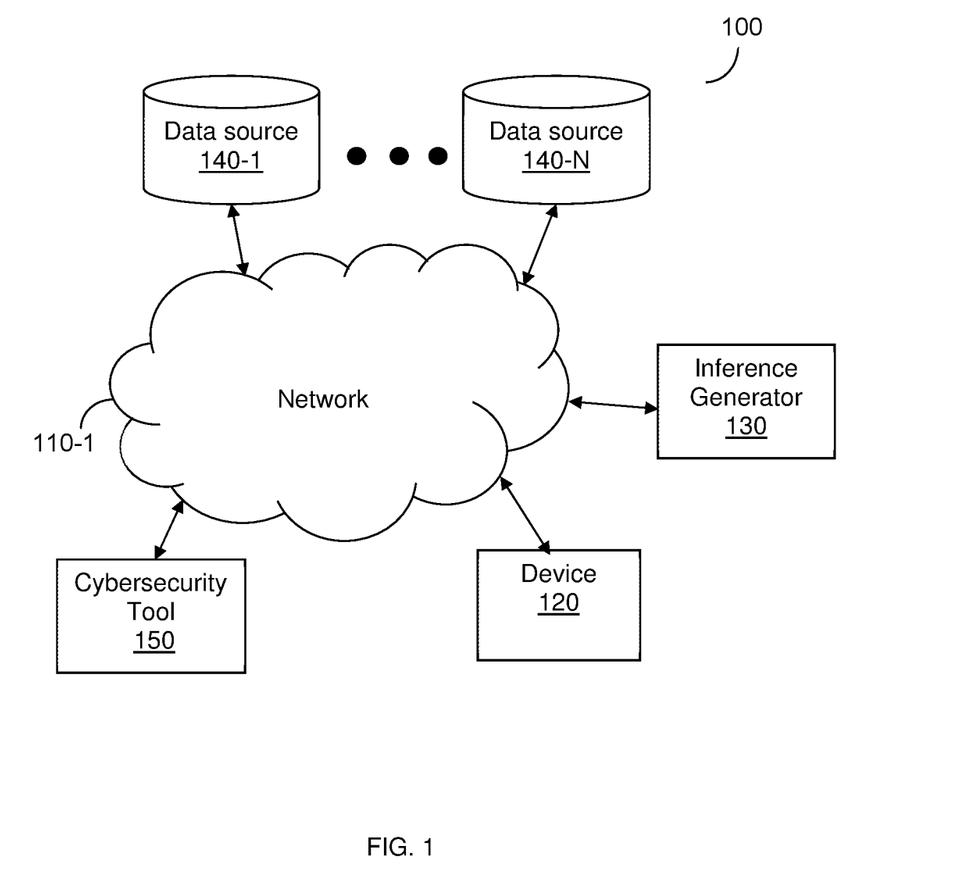
FIG. 1 is a network diagram utilized to describe various disclosed embodiments.

FIG. 1 shows an example network diagram 100 utilized to describe the various disclosed embodiments. In the example network diagram 100, one or more devices 120 (hereinafter referred to individually as a device 120 and collectively as devices 120, merely for simplicity purposes), an inference generator 130, and a plurality of data sources 140-1 through 140-N (hereinafter referred to individually as a data source 140 and collectively as data sources 140, merely for simplicity purposes) are communicatively connected via a network 110.

The network 110 may be, but is not limited to, a wireless, cellular or wired network, a local area network (LAN), a wide area network (WAN), a metro area network (MAN), the Internet, the worldwide web (WWW), similar networks, and any combination thereof.

Each device 120 is assigned a Media Access Control (MAC) address, for example by a manufacturer (not shown) of the device 120. The device 120 may be, but is not limited to, a network adaptor, network interface card, smartphone, or other network device having a network interface configured to connect to a network.

The inference generator 130 is configured to infer device models using MAC address data as described herein. To this end, the inference generator 130 may be configured to utilize MAC address data stored in the data sources 140. The MAC address data may include, but is not limited to, MAC addresses, model identifying data (e.g., device model names or other identifiers), device names, device behavioral data, combinations thereof, and the like.

The inference generator 130 is further configured to retrieve the MAC address data from the data sources 140. In an embodiment, based on the retrieved MAC address data, the inference generator 130 is configured to generate and apply a statistical model. Applying the statistical model anonymizes the data, thereby improving cybersecurity and allowing for compliance with privacy and other regulatory requirements.

In some embodiments, the inference generator 130 is configured to generate a device profile including the inferred device model or to add the inferred device model to a device profile. In a further embodiment, the inference generator 130 is configured to monitor activity of the device 120 in order to mitigate any potentially malicious behavior by the device 120, to mitigate any potential vulnerabilities of the device 120, or both. Such potentially malicious behavior or potential vulnerabilities may be detected based on the device profile and behavior of the device, device configuration, or both. Alternatively, the inference generator 130 may send the inferred device model or the device profile including the inferred device model to an optional cybersecurity tool 150.

Figure 2:
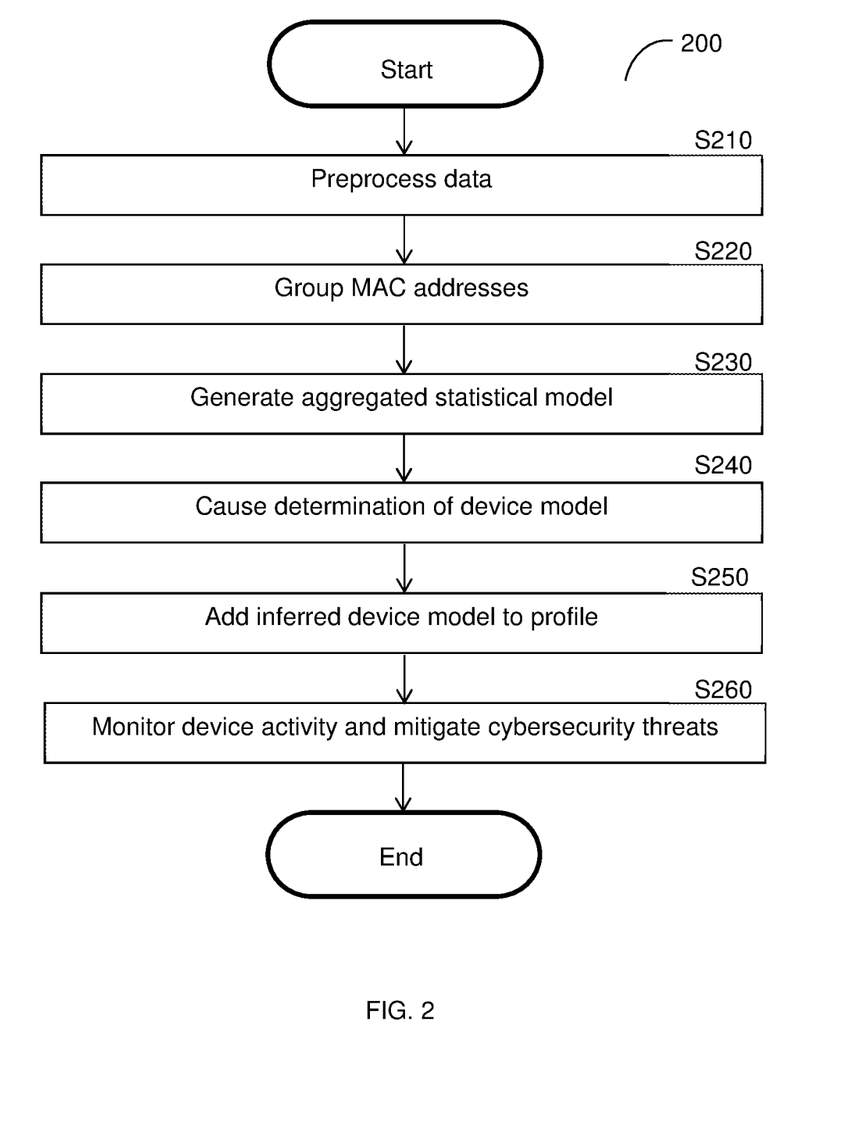
FIG. 2 is a flowchart illustrating a method for inferring device models based on MAC addresses according to an embodiment.

FIG. 2 is a flowchart 200 illustrating a method for inferring device models based on MAC addresses according to an embodiment.

At optional S210, MAC address data is preprocessed. The MAC address data may include, but is not limited to, MAC addresses, model identifying data (e.g., device model names or other identifiers), device names, device behavioral data, combinations thereof, and the like.

In an embodiment, S210 includes unifying device model names, normalizing device model resolutions, excluding data of one or more devices from further processing, a combination thereof, and the like. Various preprocessing steps are now discussed further with respect to FIG. 3.

Figure 3:
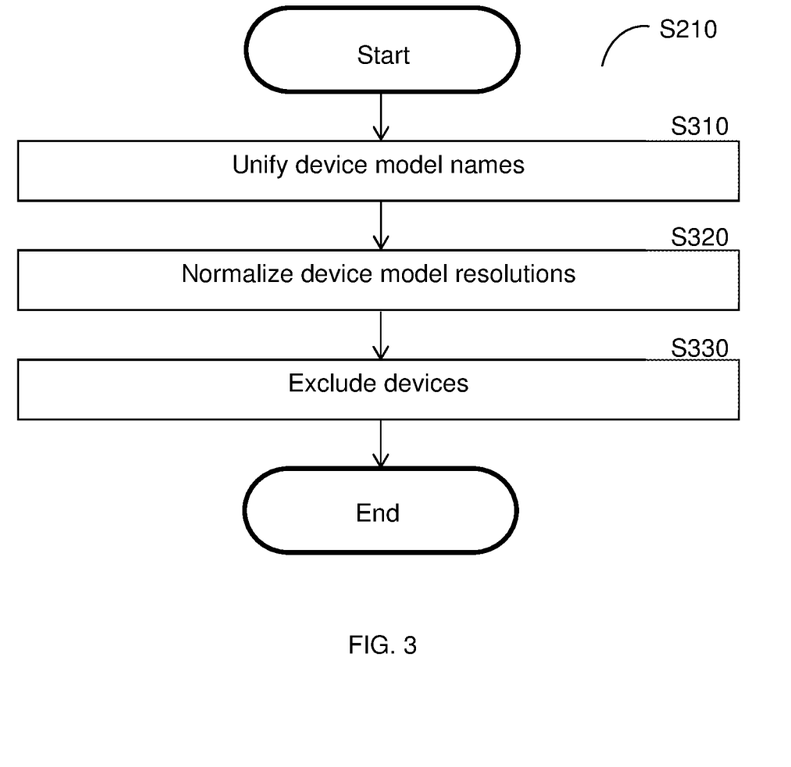
FIG. 3 is a flowchart illustrating a method for preprocessing MAC address data according to an embodiment.

FIG. 3 is a flowchart S210 illustrating a method for preprocessing MAC address data according to an embodiment.

At S310, device model names among the MAC address data are unified. The unified device model names follow the same naming convention such that synonymous device model names that are different but refer to the same device model are changed into the same format. In this regard, it is noted that device model names, particularly those from different data sources, may be formatted differently in a manner that may cause device models to be erroneously identified as different. Thus, unifying these device model names into the same format improves accuracy of device model inferences.

At S320, device model resolutions are normalized. The resolution of a device model is the degree of specificity. In this regard, it is noted that device model identifiers may be different levels of detail. This difference in detail may cause some device models to be erroneously identified as different. Thus, normalizing device model resolutions improves accuracy of device model inferences. As a non-limiting example, for a device that is model "Y" and produced by "Manufacturer X," device model identifiers for devices having the same model of device from different data sources may be "Model Y" and "Manufacturer X Device," respectively. These different resolutions therefore may be erroneously identified as different device models.

To resolve potential conflicts during device resolution normalization, S320 may further include applying an ontology. The ontology is designed to resolve and distinguish general device model identifiers from private identifiers.

At S330, some or all of the devices identified in the MAC address data may be excluded. In an embodiment, the exclusions are based on a library of blacklisted attributes. To this end, the excluded devices may include, but are not limited to, devices included in a blacklist, devices belonging to a category of blacklisted devices, devices made by blacklisted manufacturers, and the like.

In some implementations, S330 may further include retrieving the library of blacklisted attributes. The retrieval may occur periodically, each time the library would be used, and the like. Retrieving data indicating blacklisted attributes when those blacklists would be used allows for ensuring that rules are up-to-date with new devices or manufacturers.

In this regard, it has been identified that some devices may have attributes for which precise predictions cannot be made due to statistical insignificance and, therefore, could result in inaccurate device model inferences. As non-limiting examples, some manufacturers may assign MAC addresses sporadically, some device models or categories of device models may behave differently in different network settings, and some network hardware is designed for general purpose use which may behave differently than would be expected for comparable devices. These unusual attributes increase the likelihood that an incorrect device model is inferred. Thus, excluding device data based on one or more of the criteria noted above increases the accuracy of device model inferences.

It should be noted that the steps of FIG. 3 are depicted in a particular order for example purposes, but that the method of FIG. 3 is not limited to the depiction shown in FIG. 3. In some implementations, the steps may be performed in a different order, and some of the steps may not be performed.

Returning to FIG. 2, at S220, MAC addresses are grouped. In an embodiment, the groupings are based on prefixes of the MAC addresses. In a further embodiment, the divisions are based on respective blocks of the MAC addresses. In yet a further embodiment, the blocks used to determine the divisions are blocks including the 8 digit prefixes and 10 digit prefixes (hereinafter referred to as "8-block" and "10-block," respectively) of the MAC addresses. The 8-block includes the first 8 hexadecimal digits of the MAC address, while the 10-block includes the first 10 hexadecimal digits of the MAC address.

At S230, an aggregated statistical model is generated. In an embodiment, S230 includes determining weights to be used as part of the aggregated statistical model based on the MAC address data. In a further embodiment, S230 includes storing data for each block and generating logic for selecting the best model for incoming MAC addresses. The logic for model selection is based on sets of rules applied over neighboring MAC addresses and device-models that have been previously selected for those neighboring MAC addresses. The logic is a set of rules generated based on a validation set. As a non-limiting example, an inference can be determined using a rule which prioritizes the most frequent device model within a 10-block to the extent its aggregated count is greater than 10 with a ratio greater than 0.65. This ratio will be used as the prediction score for this device-model.

In an embodiment, S230 further includes determining statistics based on the MAC address data. Such block statistics include, but are not limited to, a number of occurrences of each block and a ratio of the number of the occurrences of the block relative to the entire population of blocks of the MAC addresses. In a further embodiment, the statistics are determined for each grouping of addresses grouped at S220.

At S240, the aggregated statistical model is applied to the MAC address data and the block statistics, thereby causing determination of an inferred device model for one or more of the MAC addresses. More specifically, for each MAC address, the logic generated based on the MAC address's statistics is applied to blocks having the same prefix in order to determine the inferred device model. In an embodiment, S240 includes determining inferred device models and a confidence level for each inferred device model. In an example implementation, the confidence level is a probability score between 0 and 1. In a further embodiment, only inferred device models having confidence levels above a threshold are used as the determined inferred device models.

At optional S250, each inferred device model is added to a respective device profile. The device profile to which inferred device model is added is a device profile of a networking device to which the respective MAC address is assigned.

At optional S260, device activity of one or more of the profiled devices may be monitored and potential cybersecurity threats identified via the monitoring may be mitigated. The monitoring and mitigation may include, but is not limited to, monitoring for abnormal or otherwise malicious behavior, detecting vulnerable devices, both, and the like.

In an example implementation, the device profile may be generated, potential vulnerabilities may be detected, or both, as described further in U.S. Pat. No. 10,511,620, assigned to the common assignee, the contents of which are hereby incorporated by reference.

Figure 4:
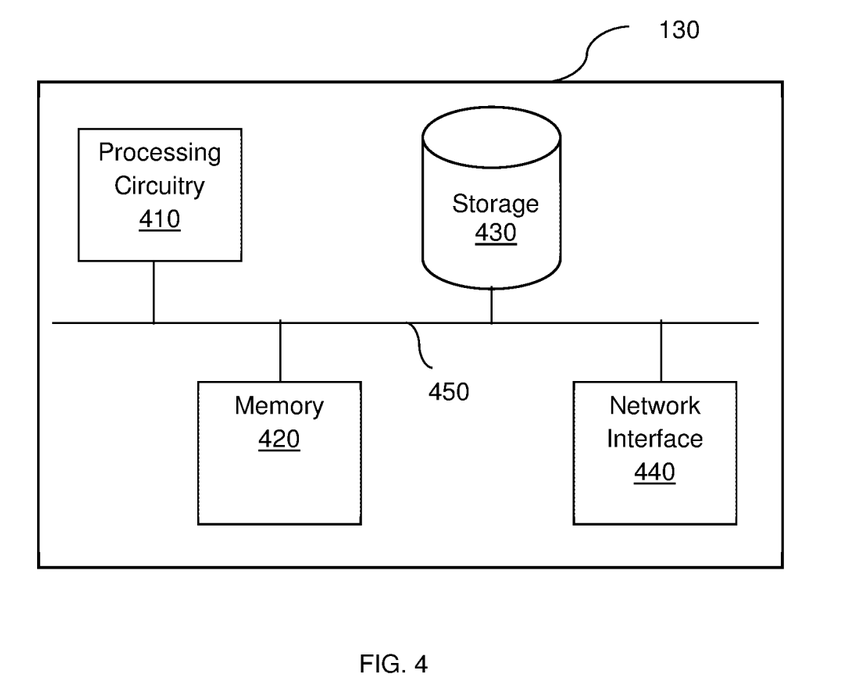
FIG. 4 is a schematic diagram of an inference generator according to an embodiment.

FIG. 4 is an example schematic diagram of an inference generator 130 according to an embodiment. The inference generator 130 includes a processing circuitry 410 coupled to a memory 420, a storage 430, and a network interface 440. In an embodiment, the components of the inference generator 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the inference generator 130 to communicate with the data sources 140 for the purpose of, for example, sending statistical models, and the like. Further, the network interface 440 allows the inference generator 130 to communicate with the cybersecurity tool 150 for the purpose of sending device profiles or portions thereof for use in cybersecurity activities.

It should be understood that the embodiments described herein are not limited to the specific architecture illustrated in FIG. 4, and other architectures may be equally used without departing from the scope of the disclosed embodiments.

It should also be noted that the various disclosed embodiments are described with respect to prefixes of MAC addresses, but that the disclosed embodiments may be generally applicable to any portion of MAC addresses storing the relevant data discussed herein regardless of whether those portions are prefixes. As a non-limiting example, if the same data were grouped based on OUIs and stored based on decimal values, the disclosed embodiments could be applied based on the suffixes instead of the prefixes. The disclosed embodiments do not require that MAC address data be organized as assumed herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inferring device models, comprising:
   determining block statistics for each block of a plurality of blocks of a plurality of media access control (MAC) addresses, the plurality of blocks having a plurality of respective prefixes, wherein the plurality of blocks is grouped based on commonalities among the plurality of respective prefixes, wherein the block statistics include a ratio of a number of occurrences of each block to the total number of occurrences of the plurality of blocks;
   generating an aggregated statistical model for the plurality of blocks based on the plurality of MAC addresses and the block statistics, wherein each block is a prefix included in one of the plurality of MAC addresses; and
   applying the aggregated statistical model to the block statistics of at least one block of the plurality of blocks in order to determine at least one inferred device model, wherein each of the at least one block is grouped into the same group.

2. The method of claim 1, wherein applying the aggregated statistical model to the block statistics further comprises:
   determining a potential device model and a corresponding confidence level for each block, wherein each inferred device model is a potential device model having a corresponding confidence level above a threshold.

3. The method of claim 1, further comprising:
adding a first inferred device model of the at least one inferred device model to a device profile.

4. The method of claim 3, further comprising:
monitoring behavior of a networking device based on the device profile to detect abnormal behavior of the first networking device, wherein the abnormal behavior is a deviation from a predetermined normal behavior associated with the first inferred device model device model.

5. The method of claim 1, wherein the plurality of MAC addresses is included in networking model device data, further comprising:
preprocessing the networking device model data, wherein preprocessing the networking device model data further comprises unifying a plurality of device model names among the networking device model data based on an ontology, wherein the ontology defines synonymous device model names.

6. The method of claim 1, wherein the plurality of MAC addresses is included in networking model device data, further comprising:
preprocessing the networking device model data, wherein preprocessing the networking device model data further comprises normalizing a plurality of device model names among the networking device model data such that like device model names of the plurality of device model names have the same resolution.

7. The method of claim 1, wherein the plurality of MAC addresses is included in networking model device data, further comprising:
preprocessing the networking device model data, wherein preprocessing the networking device model data further comprises excluding at least one MAC address of the plurality of MAC addresses from subsequent processing based on at least one blacklist.

8. The method of claim 1, further comprising:
grouping the plurality of MAC addresses based on the plurality of blocks, wherein each block is a portion of a prefix of the respective MAC address, wherein the aggregated statistical model is generated based further on the grouping.

9. A non-transitory computer readable medium having stored thereon instructions for causing a processing circuitry to execute a process, the process comprising:
determining block statistics for each block of a plurality of blocks of a plurality of media access control (MAC) addresses, the plurality of blocks having a plurality of respective prefixes, wherein the plurality of blocks is grouped based on commonalities among the plurality of respective prefixes, wherein the block statistics include a ratio of a number of occurrences of each block to the total number of occurrences of the plurality of blocks;
generating an aggregated statistical model for the plurality of blocks based on the plurality of MAC addresses and the block statistics, wherein each block is a prefix included in one of the plurality of MAC addresses; and
applying the aggregated statistical model to the block statistics of at least one block of the plurality of blocks in order to determine at least one inferred device model, wherein each of the at least one block is grouped into the same group.

10. A system for inferring device models, comprising:
a processing circuitry; and
a memory, the memory containing instructions that, when executed by the processing circuitry, configure the system to:
determine block statistics for each block of a plurality of blocks of a plurality of media access control (MAC) addresses, the plurality of blocks having a plurality of respective prefixes, wherein the plurality of blocks is grouped based on commonalities among the plurality of respective prefixes, wherein the block statistics include a ratio of a number of occurrences of each block to the total number of occurrences of the plurality of blocks;
generate an aggregated statistical model for the plurality of blocks based on the plurality of MAC addresses and the block statistics, wherein each block is a prefix included in one of the plurality of MAC addresses; and
apply the aggregated statistical model to the block statistics of at least one block of the plurality of blocks in order to determine at least one inferred device model, wherein each of the at least one block is grouped into the same group.

11. The system of claim 10, wherein the system is further configured to:
determine a potential device model and corresponding confidence level for each block, wherein each inferred device model is a potential device model having a corresponding confidence level above a threshold.

12. The system of claim 10, wherein the system is further configured to:
add a first inferred device model of the at least one inferred device model to a device profile.

13. The system of claim 12, wherein the system is further configured to:
monitor behavior of a networking device based on the device profile to detect abnormal behavior of the first networking device, wherein the abnormal behavior is a deviation from a predetermined normal behavior associated with the first inferred device model device model.

14. The system of claim 10, wherein the plurality of MAC addresses is included in networking model device data, wherein the system is further configured to:
preprocess the networking device model data, wherein preprocessing the networking device model data further comprises unifying a plurality of device model names among the networking device model data based on an ontology, wherein the ontology defines synonymous device model names.

15. The system of claim 10, wherein the plurality of MAC addresses is included in networking model device data, wherein the system is further configured to:
preprocess the networking device model data, wherein preprocessing the networking device model data further comprises normalizing a plurality of device model names among the networking device model data such that like device model names of the plurality of device model names have the same resolution.

16. The system of claim 10, wherein the plurality of MAC addresses is included in networking model device data, wherein the system is further configured to:
preprocess the networking device model data, wherein preprocessing the networking device model data further comprises excluding at least one MAC address of the plurality of MAC addresses from subsequent processing based on at least one blacklist.

17. The system of claim 10, wherein the system is further configured to:
group the plurality of MAC addresses based on the plurality of blocks, wherein each block is a portion of a prefix of the respective MAC address, wherein the aggregated statistical model is generated based further on the grouping.

18. The system of claim 10, wherein the at least one blacklist includes any of: a blacklist of device models, a blacklist of categories of device models, and a blacklist of manufacturers.

\* \* \* \* \*